(12) United States Patent  
Hashimoto

(10) Patent No.: US 12,539,662 B2  
(45) Date of Patent: Feb. 3, 2026

(54) MOLDING METHOD

(71) Applicant: FUJI CORPORATION, Chiryu (JP)

(72) Inventor: Yoshitaka Hashimoto, Kariya (JP)

(73) Assignee: FUJI CORPORATION, Chiryu (JP)

( * ) Notice: Subject to any disclaimer, the term of this patent is extended or adjusted under 35 U.S.C. 154(b) by 174 days.

(21) Appl. No.: 17/906,596

(22) PCT Filed: Mar. 17, 2020

(86) PCT No.: PCT/JP2020/011684  
§ 371 (c)(1),  
(2) Date: Sep. 16, 2022

(87) PCT Pub. No.: WO2021/186539  
PCT Pub. Date: Sep. 23, 2021

(65) Prior Publication Data  
US 2023/0144493 A1 May 11, 2023

(51) Int. Cl.  
*B29C 64/112* (2017.01)  
*B29C 64/188* (2017.01)  
(Continued)

(52) U.S. Cl.  
CPC .......... *B29C 64/112* (2017.08); *B29C 64/188* (2017.08); *B29C 64/218* (2017.08);  
(Continued)

(58) Field of Classification Search  
CPC ......... B33Y 10/00; B33Y 30/00; B33Y 40/00; B33Y 70/00; B29C 64/112; B29C 64/188; B29C 64/218; B29C 64/264  
See application file for complete search history.

(56) References Cited

U.S. PATENT DOCUMENTS

2002/0187279 A1* 12/2002 Koide .................. C08J 7/12  
427/551  
2005/0064633 A1* 3/2005 Mikoshiba .............. C23C 4/123  
438/161  
(Continued)

FOREIGN PATENT DOCUMENTS

JP 2016-16553 A 2/2016  
JP WO 2019/058515 A1 3/2019

OTHER PUBLICATIONS

Furio et al. "Light Irradiation Tuning of Surface Wettability, Optical, and Electric Properties of Graphene Oxide Thin Films", Nanotechnology 28 054003, 2017 (Year: 2017).*

(Continued)

*Primary Examiner* — Galen H Hauth  
*Assistant Examiner* — Baileigh Kate Darnell  
(74) *Attorney, Agent, or Firm* — Oblon, McClelland, Maier & Neustadt, L.L.P.

(57) ABSTRACT

A molding method includes a discharging step of discharging a resin material on a cured resin layer, a flattening step of transferring a part of the resin material discharged by the discharging step from the cured resin layer to a roller to flatten the resin material, and a curing step of irradiating the resin material flattened by the flattening step with light having a predetermined light amount to cure the resin material, and forming a new cured resin layer on the cured resin layer, in which the discharging step, the flattening step, and the curing step are repeatedly executed, and the cured resin layer is laminated, and the light amount is used in which a first contact angle of the resin material with respect to the cured resin layer is larger than a second contact angle of the resin material with respect to the roller.

5 Claims, 8 Drawing Sheets

(51) Int. Cl.
*B29C 64/218* (2017.01)
*B33Y 10/00* (2015.01)
*B33Y 40/00* (2020.01)
*B33Y 70/00* (2020.01)

(52) U.S. Cl.
CPC .............. *B33Y 10/00* (2014.12); *B33Y 40/00* (2014.12); *B33Y 70/00* (2014.12)

(56) References Cited

U.S. PATENT DOCUMENTS

| | | | |
|---|---|---|---|
| 2016/0059482 A1 | 3/2016 | Hakkaku et al. | |
| 2017/0210065 A1* | 7/2017 | Kanda | B29C 64/209 |
| 2018/0071983 A1 | 3/2018 | Ochi et al. | |
| 2018/0215079 A1* | 8/2018 | Hakkaku | B29C 33/442 |
| 2019/0337234 A1* | 11/2019 | Hashimoto | G06F 30/00 |

OTHER PUBLICATIONS

English translation of WO2017006412A1 (Year: 2017).*
International Search Report Issued Jun. 9, 2020, in PCT/JP2020/011684, filed on Mar. 17, 2020, 2 pages.

* cited by examiner

MOLDING METHOD

TECHNICAL FIELD

The present disclosure relates to a molding method of molding a molded object with a resin material using a three-dimensional lamination molding method.

BACKGROUND ART

Conventionally, a technique for molding a molded object using a resin material has been developed. For example, Patent Literature 1 discloses a technique related to a molding device for molding a molded object using an ultraviolet curable resin. The molding device of Patent Literature 1 is provided with a roller for flattening the ultraviolet curable resin discharged from the discharge unit. The roller rotates in a state of being in contact with the discharged layer of the ultraviolet curable resin, so that the ultraviolet curable resin on the surface of the layer is scraped off to flatten the surface.

PATENT LITERATURE

Patent Literature 1: JP-A-2016-16553

BRIEF SUMMARY

Technical Problem

In a flattening step using the roller described above, flattening is executed by transferring a predetermined amount of the ultraviolet curable resin from the layer of the ultraviolet curable resin to the surface of the roller, and scraping off the ultraviolet curable resin. In a case where the transfer amount of the ultraviolet curable resin to the roller is small, there is a possibility that unevenness may remain on the surface of the layer of the ultraviolet curable resin, and the surface may not be sufficiently flattened. Therefore, a flattening technique for increasing the transfer amount of the ultraviolet curable resin to the roller is desired.

The present disclosure has been made in view of the above-described actual circumstances, and an object thereof is to provide a molding method capable of flattening a discharged resin material by using a roller.

Solution to Problem

In order to solve the above-described problems, a molding method according to the present disclosure includes a discharging step of discharging a resin material on a cured resin layer, a flattening step of transferring a part of the resin material discharged by the discharging step from the cured resin layer to a roller to flatten the resin material, and a curing step of irradiating the resin material flattened by the flattening step with light having a predetermined light amount to cure the resin material, and forming a new cured resin layer on the cured resin layer, in which the discharging step, the flattening step, and the curing step are repeatedly executed, and the cured resin layer is laminated, and the light amount is used in which a first contact angle of the resin material with respect to the cured resin layer is larger than a second contact angle of the resin material with respect to the roller.

Advantageous Effects

As a result, when the discharge, flattening, and curing of the resin material are repeatedly executed, the light amount in which the first contact angle of the resin material with respect to the cured resin layer is larger than the second contact angle of the resin material with respect to the roller is used. As a result, by setting the first contact angle of the cured resin layer relatively larger than the second contact angle of the roller, the resin material is easily repelled from the cured resin layer, and the resin material is easily transferred to the roller. Accordingly, by adjusting the light amount in the curing step, the amount of transfer to the roller in the flattening step can be increased, and the resin material can be further flattened using the roller. It is possible to suppress the unevenness of the surface of the cured resin layer.

DESCRIPTION OF EMBODIMENTS (Configuration of Mounting Board Manufacturing Apparatus)

Figure 1:
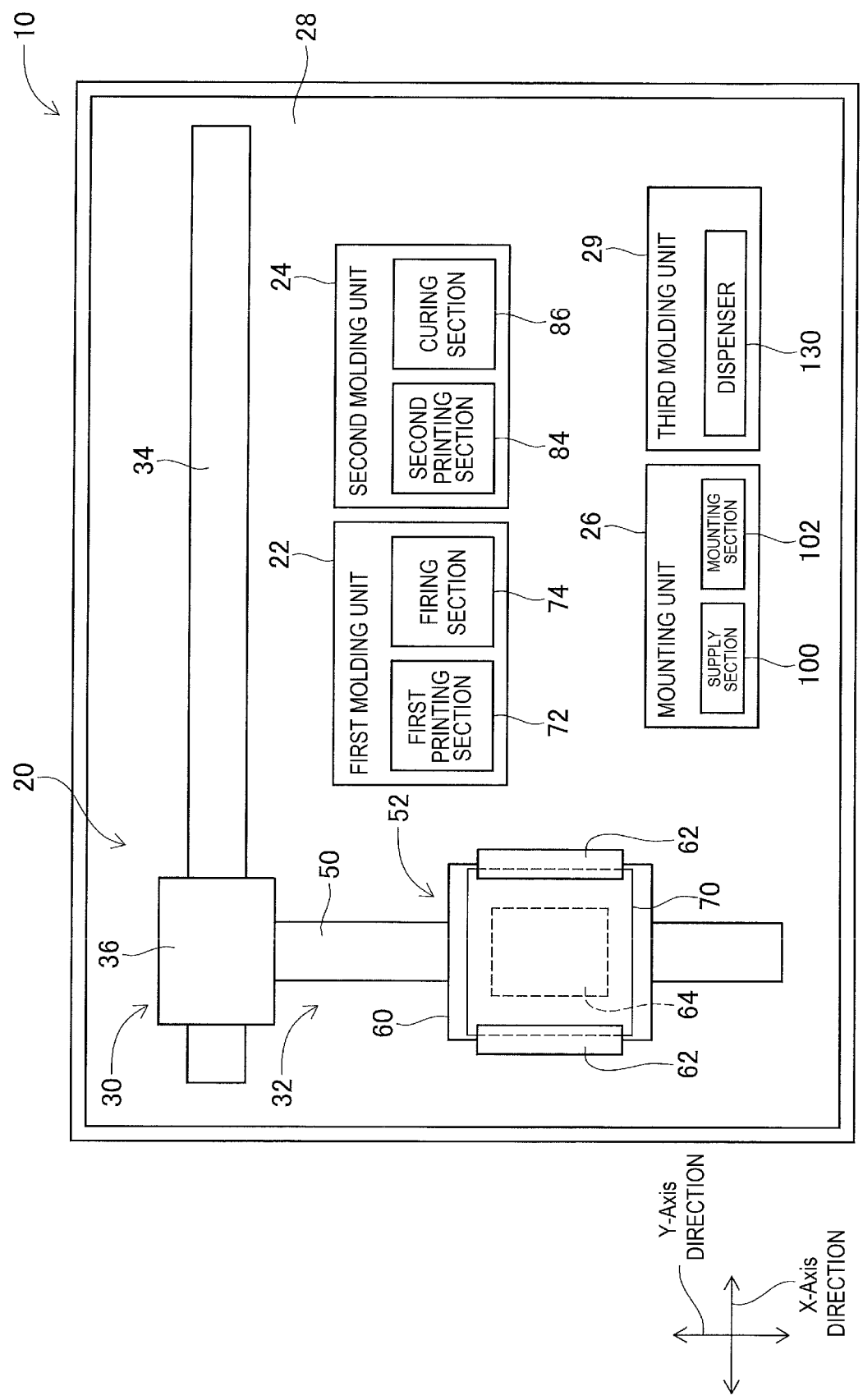
FIG. 1 illustrates a mounting board manufacturing apparatus.

Hereinafter, preferred embodiments of the present disclosure will be described in detail with reference to the drawings. FIG. 1 illustrates mounting board manufacturing apparatus 10. Mounting board manufacturing apparatus 10 is provided with conveyance device 20, first molding unit 22, second molding unit 24, mounting unit 26, third molding unit 29, and control device 27 (refer to FIGS. 2 and 3). Conveyance device 20, first molding unit 22, second molding unit 24, mounting unit 26, and third molding unit 29 are disposed on base 28 of mounting board manufacturing apparatus 10. Base 28 has normally rectangular in a plan view. In the following description, a longitudinal direction of base 28 will be referred to as an X-axis direction, a shorter direction of base 28 will be referred to as a Y-axis direction, and a direction orthogonal to both the X-axis direction and the Y-axis direction will be referred to as a Z-axis direction.

Conveyance device 20 is provided with X-axis slide mechanism 30 and Y-axis slide mechanism 32. X-axis slide mechanism 30 includes X-axis slide rail 34 and X-axis slider 36. X-axis slide rail 34 is disposed to extend in the X-axis direction on base 28. X-axis slider 36 is held by X-axis slide rail 34 to be slidable in the X-axis direction. Furthermore, X-axis slide mechanism 30 includes electromagnetic motor 38 (refer to FIG. 2) and moves X-axis slider 36 to any position in the X-axis direction by driving electromagnetic motor 38. In addition, Y-axis slide mechanism 32 includes Y-axis slide rail 50 and stage 52. Y-axis slide rail 50 is disposed to extend in the Y-axis direction on base 28. One end portion of Y-axis slide rail 50 is connected to X-axis slider 36. Therefore, Y-axis slide rail 50 is movable in the X-axis direction. Stage 52 is held by Y-axis slide rail 50 so as to be slidable in the Y-axis direction. Y-axis slide mechanism 32 includes electromagnetic motor 56 (refer to FIG. 2) and moves stage 52 to any position in the Y-axis direction by driving electromagnetic motor 56. As a result, by driving X-axis slide mechanism 30 and Y-axis slide mechanism 32, stage 52 is moved to any position on base 28.

Stage 52 includes base plate 60, holding device 62, and lifting and lowering device 64. Base plate 60 is formed in a flat plate shape, and base material 70 is placed on an upper surface thereof. Holding device 62 is provided on both side portions of base plate 60 in the X-axis direction. Holding device 62 fixedly holds base material 70 with respect to base plate 60 by interposing both edge portions in the X-axis direction of base material 70 placed on base plate 60. In addition, lifting and lowering device 64 is disposed below base plate 60, and lifts and lowers base plate 60 in the Z-axis direction.

First molding unit 22 is a unit for molding wiring on base material 70 placed on base plate 60 of stage 52, and includes first printing section 72 and firing section 74. First printing section 72 has ink jet head 76 (refer to FIG. 2) and linearly discharges conductive ink on base material 70 placed on base plate 60. The conductive ink is an example of a fluid containing metal particles of the present disclosure. The conductive ink includes, for example, fine particles of metal (such as silver) having a nanometer size as the main component dispersed in a solvent, and is cured by firing with heat. The conductive ink includes, for example, metal nanoparticles having a size of several hundred nanometers or less. The surface of the metal nanoparticle is coated with, for example, a dispersant to suppress aggregation in the solvent.

Ink jet head 76 discharges conductive ink from multiple nozzles, for example, by a piezo method using piezoelectric elements. In addition, the device for discharging conductive ink (fluid containing metal nanoparticles) is not limited to an ink jet head including multiple nozzles, and may be a dispenser including one nozzle, for example. In addition, the type of metal nanoparticles included in the conductive ink is not limited to silver, and may be copper, gold, or the like. In addition, the number of types of metal nanoparticles included in the conductive ink is not limited to one type, and may be multiple types.

Figure 2:
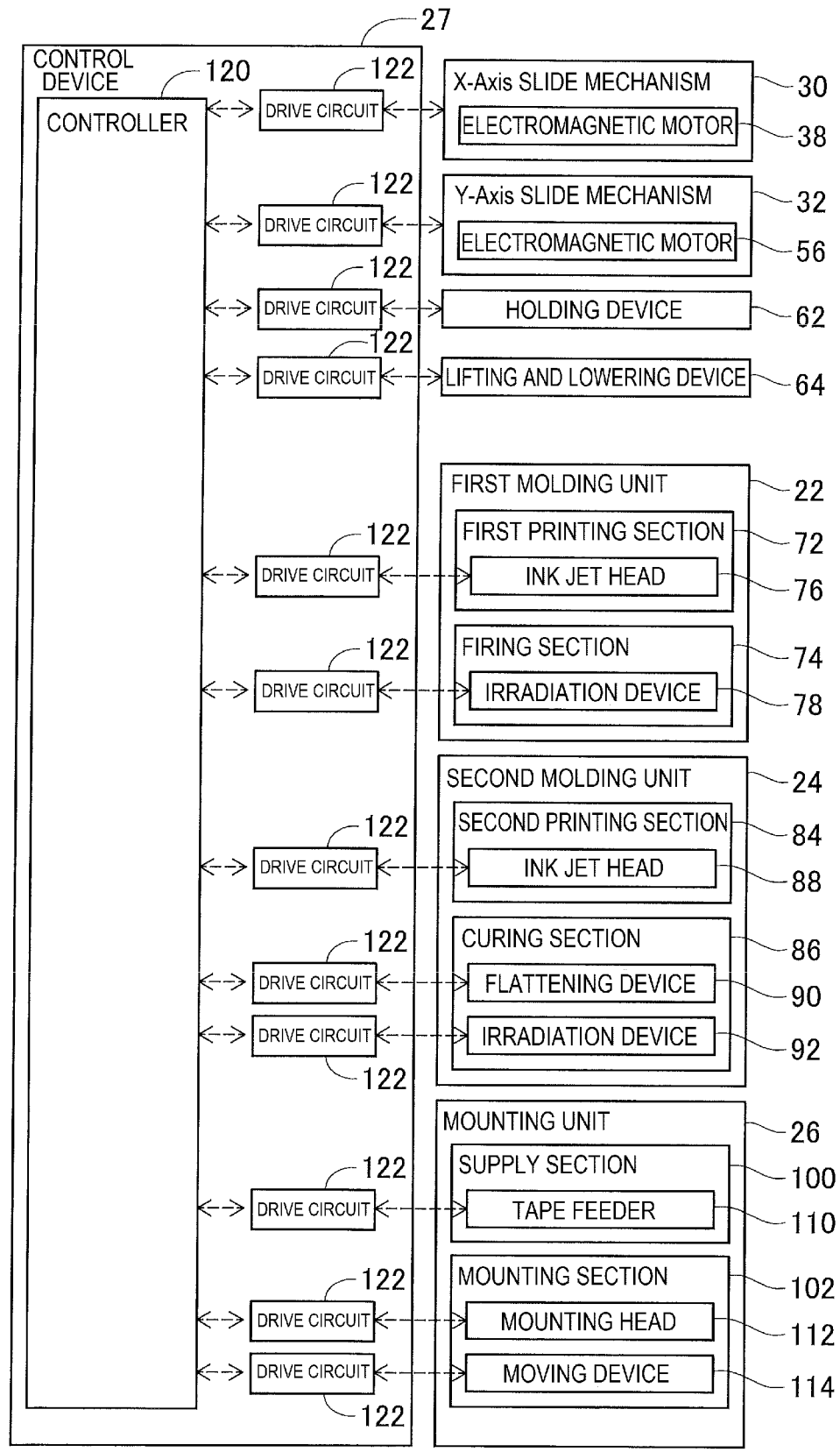
FIG. 2 is a block diagram illustrating a control device.

Firing section 74 includes irradiation device 78 (refer to FIG. 2). Irradiation device 78 is provided with, for example, an infrared heater that heats the conductive ink discharged on base material 70. The conductive ink is fired by applying heat from an infrared heater to form wiring. The firing of the conductive ink referred to herein means, for example, a phenomenon in which by applying energy, a solvent is vaporized or a protective film of the metal nanoparticles, that is, a dispersant is decomposed, and the metal nanoparticles are brought into contact with each other or fused to increase the conductivity. The wiring can be formed by firing the conductive ink. The device for heating the conductive ink is not limited to an infrared heater. For example, mounting board manufacturing apparatus 10 may include an infrared lamp, a laser irradiation device for irradiating the conductive ink with laser light, or an electric furnace in which base material 70 from which the conductive ink is discharged is placed in a furnace and heated, as a device for heating the conductive ink.

In addition, second molding unit 24 is a unit for molding a resin layer on base material 70 placed on base plate 60, and includes second printing section 84 and curing section 86. Second printing section 84 includes ink jet head 88 (refer to FIG. 2), and discharges ultraviolet curable resin 144 on base material 70 placed on base plate 60 (refer to FIG. 4). Ultraviolet curable resin 144 is a resin that is cured by irradiation with ultraviolet rays. A method by which ink jet head 88 discharges ultraviolet curable resin 144 may be, for example, a piezo method using a piezoelectric element, or may be a thermal method in which a resin is heated to generate air bubbles and discharged from multiple nozzles.

Figure 5:
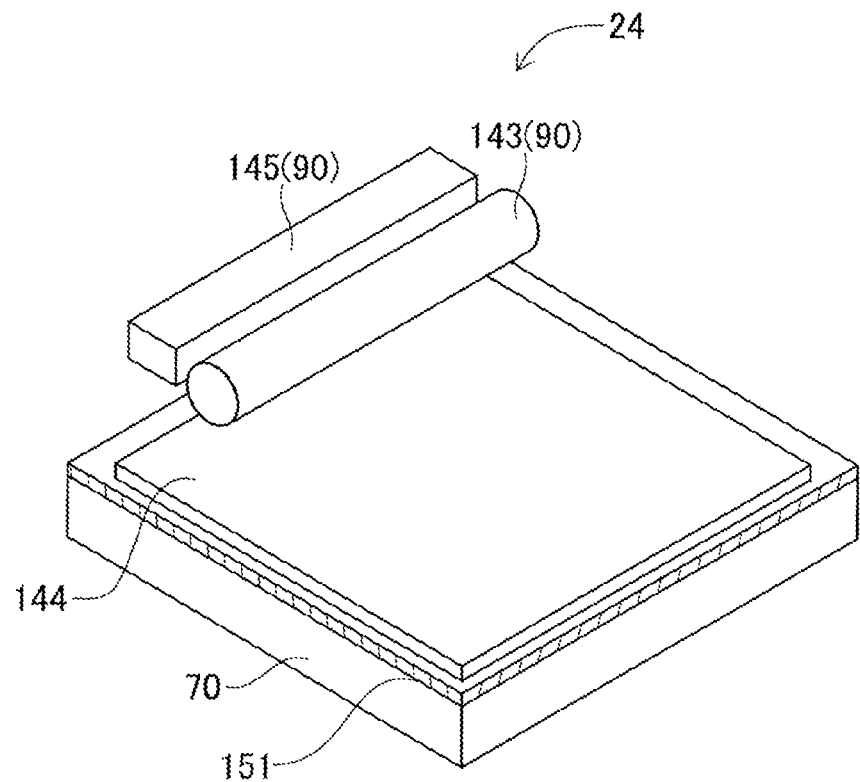
FIG. 5 is a diagram illustrating a state of being flattened by a roller.

Curing section 86 includes flattening device 90 (refer to FIG. 2) and irradiation device 92 (refer to FIG. 2). Flattening device 90 is a device for flattening an upper surface of ultraviolet curable resin 144 discharged on base material 70 by ink jet head 88. For example, as illustrated in FIG. 5, flattening device 90 includes roller 143 and collection section 145. Flattening device 90 scrapes off the excess resin by roller 143 while leveling the surface of ultraviolet curable resin 144, so that the thickness of ultraviolet curable resin 144 is uniform. Roller 143 has, for example, a cylindrical shape, and moves while rotating the surface of ultraviolet curable resin 144 in a flowable state based on the control of flattening device 90 to flatten the surface. Collection section 145 has, for example, a blade protruding toward the surface of roller 143, and stores and discharges ultraviolet curable resin 144 scraped by the blade. For example, collection section 145 discharges collected ultraviolet curable resin 144 to a waste liquid tank. Collection section 145 may return the collected ultraviolet curable resin 144 to the supply tank again. Flattening device 90 scrapes off an excess of ultraviolet curable resin 144 while leveling the surface of ultraviolet curable resin 144 to flatten the surface of ultraviolet curable resin 144.

Figure 6:
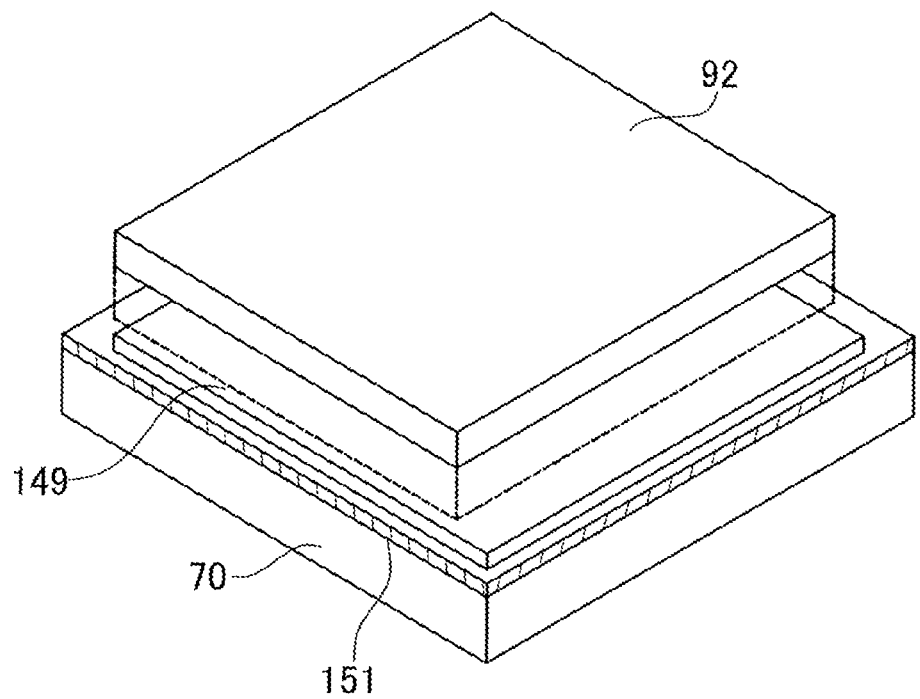
FIG. 6 is a diagram illustrating a state of being irradiated with ultraviolet rays by an irradiation device.

In addition, irradiation device 92 includes, for example, a mercury lamp or an LED as a light source. As illustrated in FIG. 6, irradiation device 92 irradiates ultraviolet curable resin 144 (refer to FIG. 5) discharged on base material 70 with ultraviolet rays. As a result, ultraviolet curable resin 144 discharged on base material 70 is cured, and thin-film cured resin layer 149 can be formed.

Mounting unit 26 is a unit for disposing an electronic component on base material 70 placed on base plate 60, and includes supply section 100 and mounting section 102. Supply section 100 includes multiple tape feeders 110 (refer to FIG. 2) for feeding the taped electronic components one by one, and supplies the electronic components at each supply position. The electronic component is, for example, a sensor element such as a temperature sensor. The supply of the electronic components is not limited to the supply by tape feeder 110, and may be performed by a tray.

Mounting section 102 includes mounting head 112 (refer to FIG. 2) and moving device 114 (refer to FIG. 2). Mounting head 112 includes a suction nozzle for picking up and holding an electronic component. The suction nozzle picks up and holds the electronic component by suction of air by supplying a negative pressure from a positive and negative pressure supply device (not illustrated). The electronic component is separated by supplying a slight positive pressure from the positive and negative pressure supply device. In addition, moving device 114 moves mounting head 112 between the supply position of tape feeder 110 and base material 70 placed on base plate 60. As a result, mounting section 102 holds the electronic component by the suction nozzle, and disposes the electronic component held by the suction nozzle on base material 70.

Third molding unit 29 is a unit for applying a conductive paste on base material 70 placed on base plate 60. The conductive paste is, for example, a viscous fluid in which micro-sized metal particles (for example, micro filler) are included in an adhesive made of resin. The micro-sized metal microparticles are, for example, metal in a flake state (silver or the like). The metal microparticles are not limited to silver, and may be gold, copper, or the like, or multiple types of metals. The adhesive contains, for example, an epoxy resin as the main component. The conductive paste is cured by heating, and is used, for example, to form a connection terminal to be connected to the wiring. The connection terminal is, for example, a bump connected to a component terminal of an electronic component, an external electrode connected to an external device, or the like.

Third molding unit 29 includes dispenser 130 as a device for applying a conductive paste. The device for applying the conductive paste is not limited to the dispenser, and may be a screen printing device or a gravure printing device. In addition, In the present disclosure, the term "applying" is a concept including an operation of discharging a fluid from a nozzle or the like, an operation of adhering a fluid on a target object by screen printing or gravure printing, an operation of applying a fluid with a pin, and the like. Dispenser 130 discharges the conductive paste on base material 70 or the resin layer. The discharged conductive paste is heated and cured by, for example, firing section 74 of first molding unit 22 to form a connection terminal (external electrode or the like).

Here, the conductive paste includes, for example, metal microparticles having a size of several tens of micrometers or less. The adhesive (resin or the like) is cured by heating, and the conductive paste is cured in a state where the metals in a flake state are in contact with each other. As described above, the conductive ink is, for example, metal integrated by fusing the metal nanoparticles by heating, and the conductivity is increased as compared with a state where the metal nanoparticles are merely in contact with each other. On the other hand, the conductive paste is cured by bringing micro-sized metal microparticles into contact with each other by curing an adhesive. Therefore, the resistance (electrical resistivity) of the wiring formed by curing the conductive ink is significantly low, for example, several to several tens of micro Ω·cm, and is lower than the resistance (several tens to several thousands of micro Ω·cm) of the wiring in which the conductive paste is cured. Accordingly, the conductive ink is suitable for molding a molded object requiring a low resistance value, such as circuit wiring having a low resistance.

On the other hand, the conductive paste can improve the adhesion with another member by curing the adhesive when curing, and is excellent in the adhesion with another member as compared with the conductive ink. Another member referred to herein is a member to which a conductive paste is adhered by discharging or the like, and is, for example, a resin layer, wiring, a component terminal of an electronic component, or the like. Accordingly, the conductive paste is suitable for molding a molded object requiring mechanical strength (tensile strength or the like), such as a connection terminal for fixing an electronic component to a resin layer. In mounting board manufacturing apparatus 10 of the present embodiment, a mounting board having improved electrical properties and mechanical properties can be manufactured by selectively using such a conductive ink and a conductive paste to utilize the characteristics.

Figure 3:
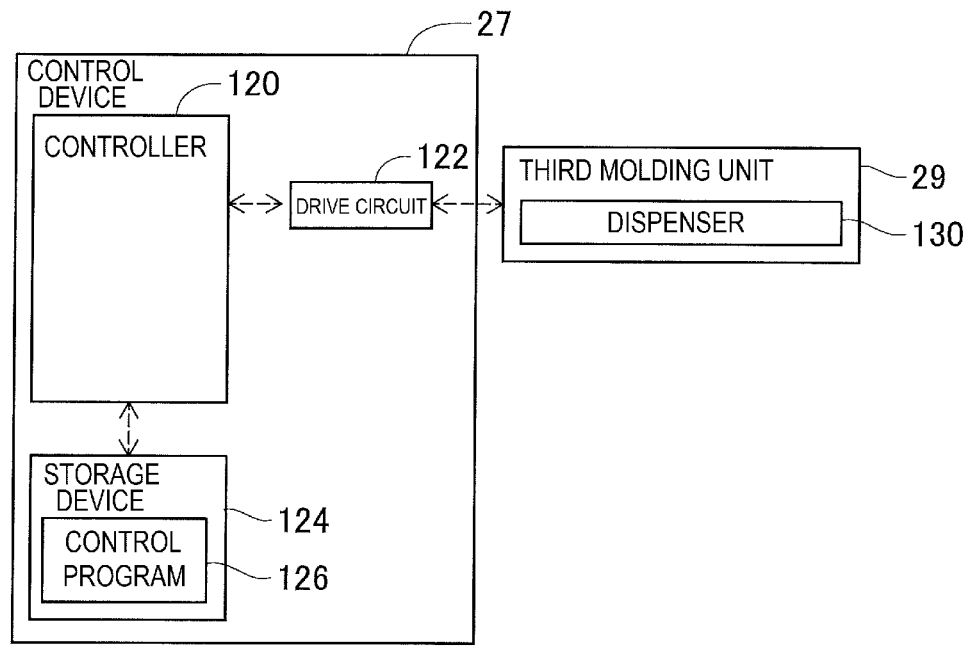
FIG. 3 is a block diagram illustrating a control device.

Next, a configuration of control device 27 of mounting board manufacturing apparatus 10 will be described. As illustrated in FIGS. 2 and 3, control device 27 is provided with controller 120, multiple drive circuits 122, and storage device 124. Multiple drive circuits 122 are connected to electromagnetic motors 38 and 56, holding device 62, lifting and lowering device 64, ink jet head 76, irradiation device 78, ink jet head 88, flattening device 90, irradiation device 92, tape feeder 110, mounting head 112, and moving device 114 (refer to FIG. 2). Furthermore, drive circuit 122 is connected to third molding unit 29 (refer to FIG. 3).

Controller 120 is provided with CPU, ROM, RAM, and the like, is mainly a computer, and is connected to multiple drive circuits 122. Storage device 124 is provided with RAM, ROM, a hard disk, and the like, and stores control program 126 for controlling mounting board manufacturing apparatus 10. Controller 120 can control the operations of conveyance device 20, first molding unit 22, second molding unit 24, mounting unit 26, third molding unit 29, and the like by executing control program 126 with CPU. In the following description, the fact that controller 120 executes control program 126 to control each device may be simply referred to as a "device". For example, the fact that "controller 120 causes stage 52 to move" means that "controller 120 executes control program 126, controls the operation of conveyance device 20 through drive circuit 122, and causes stage 52 to move by the operation of conveyance device 20".

(Operation of Mounting Board Manufacturing Apparatus)

Mounting board manufacturing apparatus 10 of the present embodiment manufactures molded object 157 (refer to FIG. 7) in which multiple cured resin layers 149 are laminated by the above-described configuration. For example, in control program 126 of storage device 124, three-dimensional data of each layer obtained by slicing molded object 157 at completion is set. Controller 120 controls first molding unit 22 and the like based on the data of control program 126 to discharge, cure, and the like ultraviolet curable resin 144 to form molded object 157.

Figure 4:
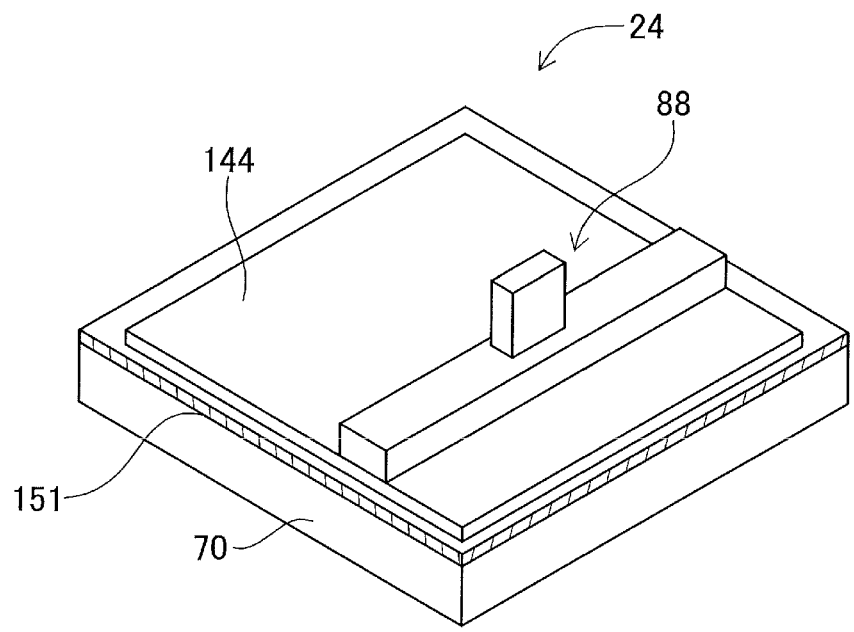
FIG. 4 is a diagram illustrating a state where an ultraviolet curable resin is discharged from an ink jet head.

First, when base material 70 is set on base plate 60 of stage 52, controller 120 molds molded object 157 on base material 70 while moving stage 52. As illustrated in FIG. 4, release film 151 which can be released by heat, for example, is adhered to the upper surface of base material 70, and molded object 157 is formed on release film 151. Release film 151 is released from base material 70 together with molded object 157 by heating. A method of separating base material 70 and molded object 157 is not limited to a method using release film 151. For example, a member (support material or the like) that is melted by heat may be disposed between base material 70 and molded object 157, and may be melted and separated. In addition, molded object 157 may be directly molded on base material 70 without using a separating member such as release film 151.

When base material 70 is set, controller 120 forms cured resin layer 149 on release film 151 as illustrated in FIG. 6. Controller 120 molds molded object 157 having a predetermined shape by laminating multiple cured resin layers 149. For example, controller 120 discharges, cures, or the like ultraviolet curable resin 144 based on the three-dimensional data of control program 126 to form cured resin layer 149.

Figure 7:
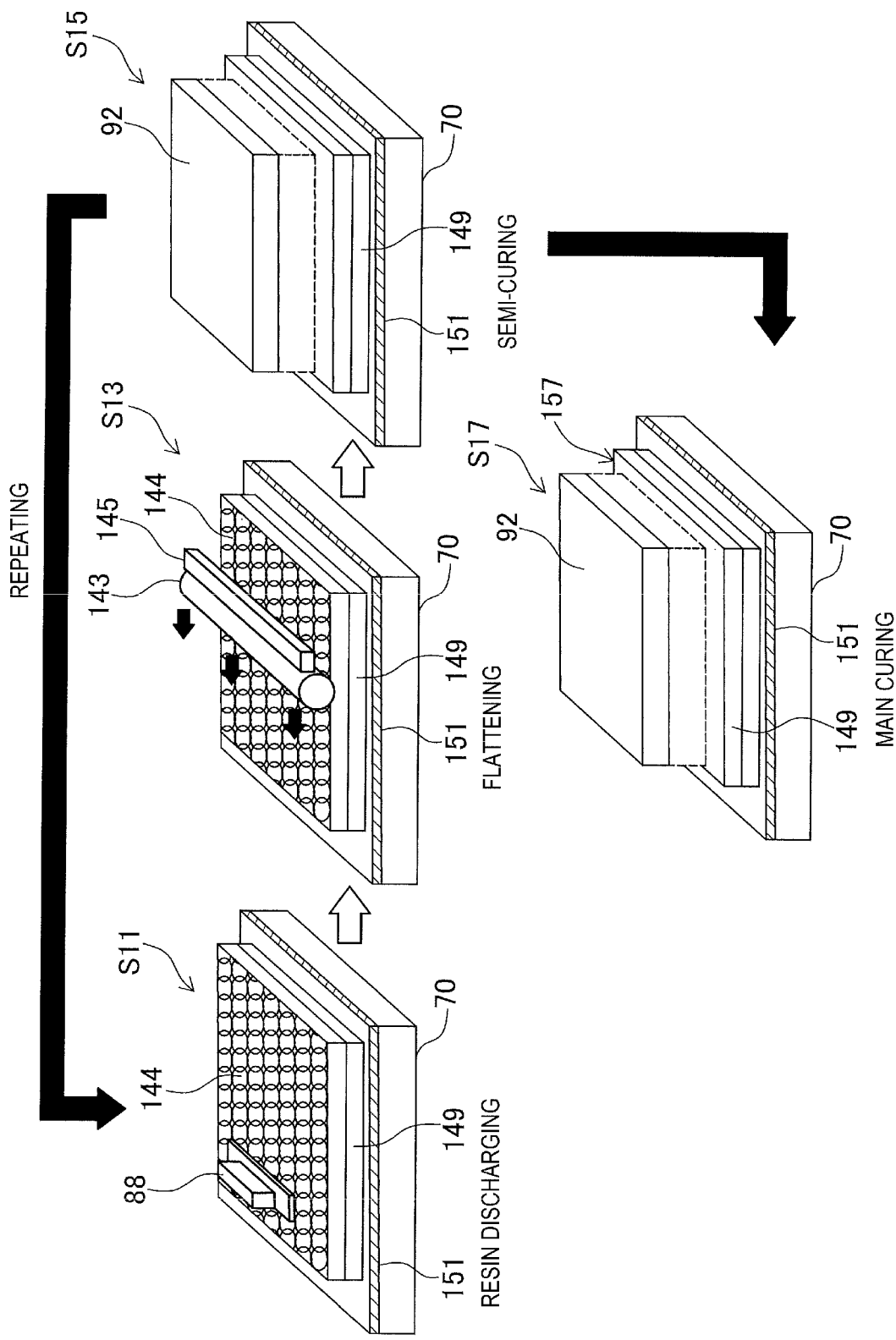
FIG. 7 is a drawing illustrating a step of manufacturing a molded object.

FIG. 7 illustrates a step of manufacturing molded object 157. First, as illustrated in step 11 in FIG. 7 (hereinafter, simply referred to as "S"), ink jet head 88 of second printing section 84 discharges droplets of ultraviolet curable resin 144 on release film 151. Discharged ultraviolet curable resin 144 adheres on release film 151 and spreads in a thin film shape.

Next, as illustrated in S13, controller 120 rotates roller 143 of flattening device 90 in a state of being in contact with thin-film ultraviolet curable resin 144 to perform flattening. Roller 143 scrapes up ultraviolet curable resin 144 in a flowable state while rotating. Scraped ultraviolet curable resin 144 adheres to the surface of roller 143, is scraped by a blade (not illustrated) of collection section 145, and is collected in collection section 145.

Next, as illustrated in S15, irradiation device 92 irradiates ultraviolet curable resin 144 on release film 151 with ultraviolet rays to semi-cure ultraviolet curable resin 144 to form cured resin layer 149 in the semi-cured state. Controller 120 repeatedly executes the processes of S11, S13, and S15 to laminate cured resin layer 149 in the semi-cured state. Controller 120 may not execute a flattening step S13 every time between a discharging step S11 and the semi-curing step S15.

The semi-cured state described above means, for example, a state where ultraviolet curable resin 144 is not completely stable at the level of physical properties, but in a case where ultraviolet curable resin 144 is discharged on cured resin layer 149 subjected to be semi-cured, ultraviolet curable resin 144 is cured to such an extent that discharged ultraviolet curable resin 144 is not mixed with cured resin layer 149 and can be laminated on cured resin layer 149 in the semi-cured state. In other words, ultraviolet curable resin 144 is cured to such an extent that cured resin layer 149 can be further laminated on cured resin layer 149 semi-cured. Controller 120 controls the intensity (intensity of light) of the ultraviolet rays irradiated from irradiation device 92 on ultraviolet curable resin 144, the scanning speed at which the ultraviolet rays are scanned with respect to ultraviolet curable resin 144, the number of times of scanning, and the like, thereby changing the light amount of ultraviolet rays to cause ultraviolet curable resin 144 to be in the semi-cured state. As a result, cured resin layer 149 in the semi-cured state can be laminated in the Z-axis direction.

Here, in the flattening step S13, when the transfer amount of ultraviolet curable resin 144 discharged on the surface of cured resin layer 149 to be transferred to roller 143 is small, it is not possible to sufficiently suppress the unevenness formed on the surface of cured resin layer 149 after the semi-curing. The fact that "suppressing the unevenness" as used herein means, for example, reducing the number of unevenness to be formed, reducing the difference in height of the unevenness, or the like.

Figure 8:
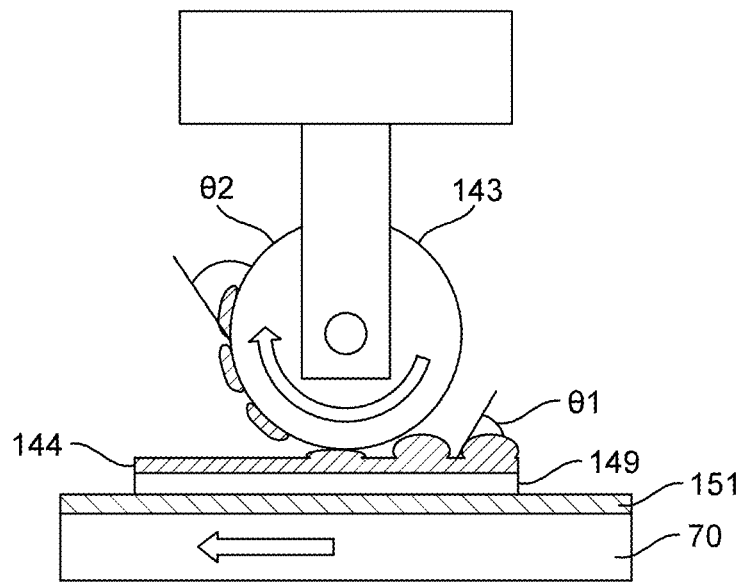
FIG. 8 is a diagram illustrating a state of being flattened by the roller.

FIG. 8 schematically illustrates a state of the flattening step by roller 143 in S13. Controller 120 of the present embodiment irradiates with ultraviolet rays from irradiation device 92 using the light amount in which first contact angle θ1 of ultraviolet curable resin 144 discharged on cured resin layer 149 in S11 with respect to cured resin layer 149 is larger than second contact angle θ2 of ultraviolet curable resin 144 with respect to roller 143 in S15.

Figure 9:
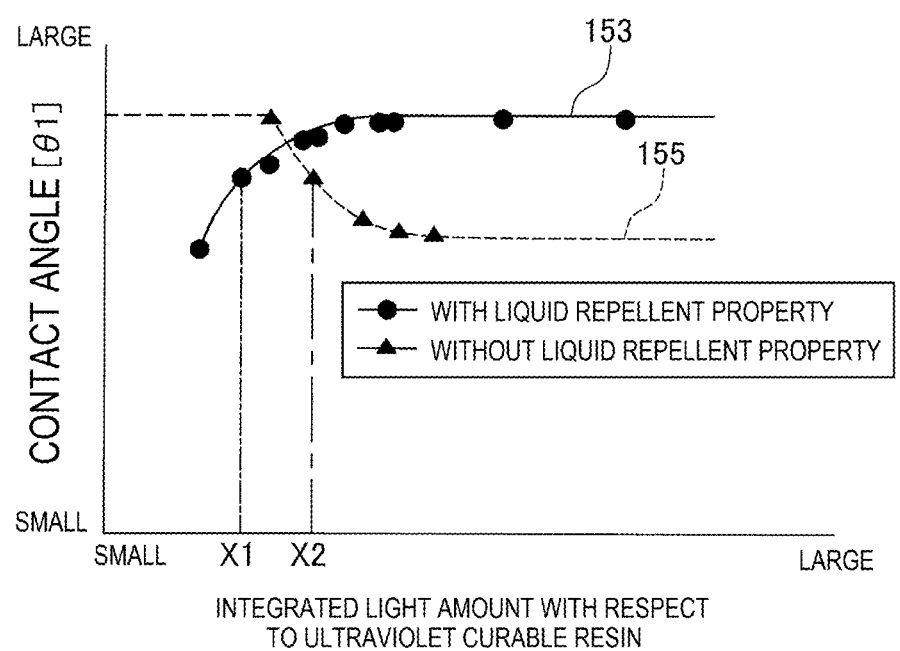
FIG. 9 is a graph illustrating a relationship between an integrated light amount with respect to an ultraviolet curable resin and a first contact angle.

Specifically, the applicant has investigated the relationship between the light amount of ultraviolet rays irradiated on ultraviolet curable resin 144 and first contact angle θ1. FIG. 9 illustrates the relationship between the integrated light amount with respect to ultraviolet curable resin 144 and first contact angle θ1. For example, the horizontal axis in FIG. 9 indicates the integrated light amount of ultraviolet rays irradiated on flattened thin-film ultraviolet curable resin 144 in the semi-curing step S15, and indicates that the integrated light amount increases in the right direction. The integrated light amount is an integration of the time during which the ultraviolet rays are irradiated per unit area and the intensity of light, and is, for example, Joules ($J/cm^2$) per unit square centimeter. The integrated light amount indicates, for example, the integrated light amount of a specific wavelength band (several hundred nm) that acts on the curing of ultraviolet curable resin 144 among the wavelengths of light included in the ultraviolet rays. In addition, the vertical axis indicates first contact angle θ1, and indicates that the angle increases in the up direction, that is, the wettability decreases and it comes to be difficult to wet (easy to repel).

First contact angle θ1 can be calculated, for example, by the formulas illustrated in the following equations 1 and 2.

[Math. 1]
$$\theta 1 = \cos^{-1}\left(\sqrt[3]{\frac{1}{a^2+1}\left(1+\sqrt{\frac{a^2}{a^2+1}}\right)} + \sqrt[3]{\frac{1}{a^2+1}\left(1-\sqrt{\frac{a^2}{a^2+1}}\right)} - 1\right)$$

herein, $$a = 4\left(\frac{r}{R}\right)^3$$

[Math. 2]
$$V = \frac{4}{3}\pi\left(\frac{r}{2}\right)^3$$

Figure 10:
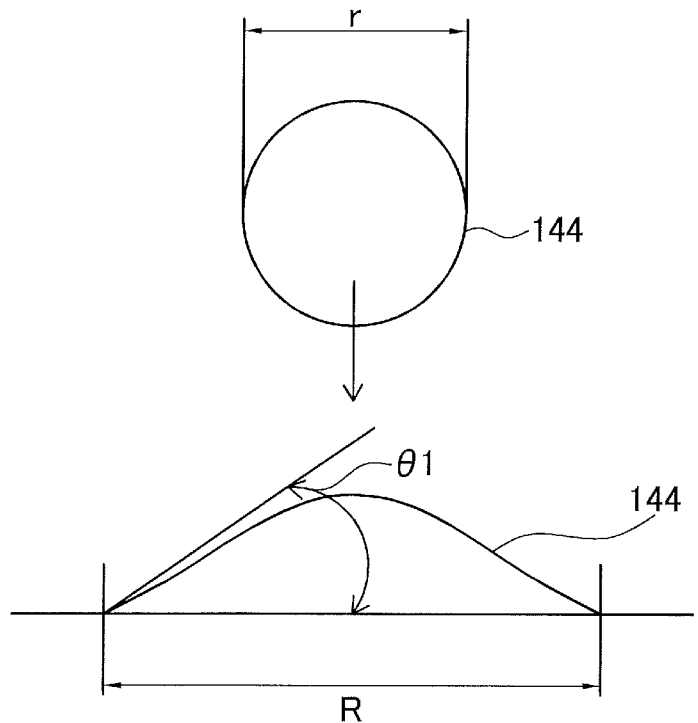
FIG. 10 is a diagram for describing the outer diameter of a droplet and an outer diameter of a dropped ultraviolet curable resin.

In the above equations, r is the outer diameter of the droplet of ultraviolet curable resin 144 discharged from ink jet head 88, as illustrated in FIG. 10. In addition, R is the outer diameter of ultraviolet curable resin 144 after being dropped on cured resin layer 149. A method of calculating first contact angle θ1 is not limited to the method using the above mathematical expression. For example, first contact angle θ1 may be calculated by analyzing an image captured of ultraviolet curable resin 144 actually dropped.

Graph 153 indicated by solid lines in FIG. 9 illustrates a case where ultraviolet curable resin 144 containing a surface adjusting agent having a liquid-repellent function is used as ultraviolet curable resin 144. As illustrated in graph 153, in a case where ultraviolet curable resin 144 containing a material having a liquid-repellent property is used, first contact angle θ1 increases as the integrated light amount of ultraviolet rays irradiated in the semi-curing step S15 increases, and the state is saturated to a predetermined angle. As first contact angle θ1 increases, ultraviolet curable resin 144 discharged on cured resin layer 149 is easily repelled from cured resin layer 149. Accordingly, next, when the flattening step S13 is executed, the transfer amount of ultraviolet curable resin 144 transferred from cured resin layer 149 to roller 143 can be increased.

Figure 11:
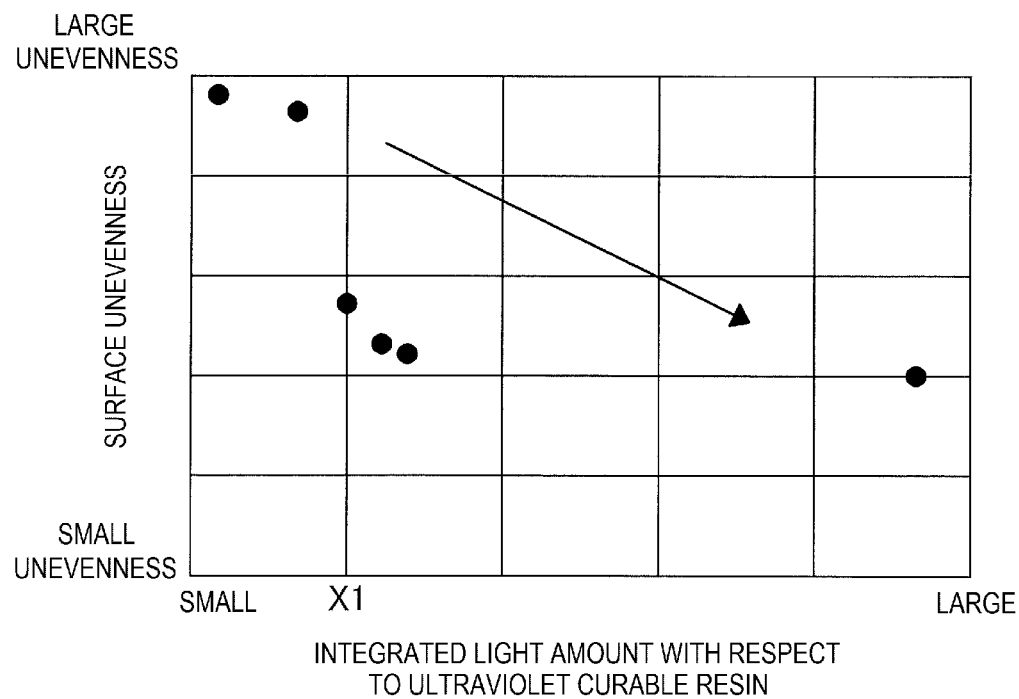
FIG. 11 is a graph illustrating a relationship between the integrated light amount with respect to the ultraviolet curable resin and the size of an unevenness formed on a surface of the cured resin layer after the semi-curing.

FIG. 11 illustrates the relationship between the integrated light amount with respect to ultraviolet curable resin 144 and the size of the unevenness formed on the surface of cured resin layer 149 after the semi-curing. Similar to FIG. 9, the horizontal axis in FIG. 11 indicates the integrated light amount of ultraviolet curable resin 144 in the semi-curing step S15, and indicates that the integrated light amount increases in the right direction. In addition, the vertical axis indicates a difference in height between the maximum value (most protruding position) and the minimum value (most recessed position) of the unevenness formed on the surface of cured resin layer 149, and indicates that the difference in height of the unevenness is increased in the up direction, that is, the unevenness increases. An estimation method of the size of the unevenness is not particularly limited, but can be measured, for example, by observing the surface of cured resin layer 149 after being semi-cured with a laser microscope.

In the measurements of FIGS. 9 and 11, for example, the shape and material of roller 143, the material of ultraviolet curable resin 144, the amount of droplets of ultraviolet curable resin 144 to be discharged, and the like were made constant. That is, among the factors affecting the size of first contact angle θ1 and the formation of the unevenness, a factor other than the light amount of ultraviolet rays was fixed under a certain condition. As illustrated in FIGS. 9 and 11, for example, by setting the integrated light amount to be first reference light amount X1 or more, first contact angle θ1 can be made equal to or more than a certain angle, and the size of the unevenness formed on the surface of cured resin layer 149 can be suppressed to be equal to or less than a certain size. It is considered that this is because ultraviolet curable resin 144 is easily repelled on cured resin layer 149, second contact angle θ2 is relatively reduced, and ultraviolet curable resin 144 is easily transferred from cured resin layer 149 to roller 143. That is, it is considered that the transfer amount of ultraviolet curable resin 144 increased. The applicant confirmed that second contact angle θ2 is reduced by several degrees to ten and several or more as compared with first contact angle θ1 in a case where the ultraviolet rays are irradiated with first reference light amount X1. It was confirmed that the difference in the unevenness was reduced to approximately ten and several μm.

Accordingly, in the molding method of the present embodiment, in a case where ultraviolet curable resin 144 containing a material having a liquid-repellent property is used, it is preferable to set the integrated light amount to a predetermined first reference light amount X1 or more, so that first contact angle θ1 is larger than second contact angle θ2. In ultraviolet curable resin 144 containing a material having a liquid-repellent property, when the light amount in the semi-curing step S15 is increased, the contact angle of ultraviolet curable resin 144 with respect to cured resin layer 149, that is, first contact angle θ1 tends to be increased (refer to graph 153 in FIG. 9). Therefore, in a case where ultraviolet curable resin 144 containing a material having a liquid-repellent property is used, by setting the integrated light amount in the semi-curing step S15 to predetermined first reference light amount X1 or more, ultraviolet curable resin 144 can be made easier to repel from cured resin layer 149, and the transfer amount can be further increased.

Although the method of changing the integrated light amount of ultraviolet rays irradiated in S15 is not limited, for example, the integrated light amount may be changed by changing at least one of the intensity of light, the scanning speed, or the number of scans. The intensity of light is the intensity of ultraviolet rays irradiated from irradiation device 92 in S15. In addition, the scanning speed is the speed at which the ultraviolet rays are scanned in a case where irradiation device 92 or base material 70 is moved to move the irradiation position of the ultraviolet rays, and the ultraviolet rays are scanned with respect to ultraviolet curable resin 144 in S15. In addition, the number of scans is the number of scans of the ultraviolet rays with respect to ultraviolet curable resin 144 in one step S15.

As a result, by changing the intensity of light, the scanning speed, and the number of scans, the integrated light amount with respect to ultraviolet curable resin 144 can be adjusted to perform flattening. In particular, by changing only the intensity of light, it is possible to make the execution time of the semi-curing step S15 more uniform as compared with the case where the scanning speed or the number of scans is changed. This is because in a case where the scanning speed or the number of scans is changed, the work time for irradiating ultraviolet curable resin 144 with the ultraviolet rays from irradiation device 92 changes. In other words, by changing only the intensity of light, it is possible to suppress change in the takt time of the manufacturing step including the semi-curing step.

On the other hand, graph 155 indicated by dashed lines in FIG. 9 illustrates a case where ultraviolet curable resin 144 not containing a surface adjusting agent having a liquid-repellent function is used as ultraviolet curable resin 144. As illustrated in graph 155, in a case where ultraviolet curable resin 144 not containing a material having a liquid-repellent property is used, first contact angle θ1 tends to decrease as the integrated light amount of ultraviolet rays irradiated in the semi-curing step is increased, contrary to graph 153 (with the material having a liquid-repellent property).

Accordingly, in ultraviolet curable resin 144 not containing a material having a liquid-repellent property, the more the curing proceeds, the smaller first contact angle θ1 of ultraviolet curable resin 144 with respect to cured resin layer 149. In a case where ultraviolet curable resin 144 not containing a material having a liquid-repellent property is used, for example, it is preferable to irradiate with ultraviolet rays having an integrated light amount equal to or less than second reference light amount X2. As a result, by setting the integrated light amount in the semi-curing step to be predetermined second reference light amount X2 or less, it is possible to suppress the decrease of first contact angle θ1 and increase the transfer amount.

In addition, in the semi-curing step S15 in FIG. 7, cured resin layer 149 in the semi-cured state is formed without completely curing ultraviolet curable resin 144. As a result, for example, in a case where ultraviolet curable resin 144 is discharged on cured resin layer 149 subjected to be semi-cured, cured resin layer 149 is semi-cured to such an extent that discharged ultraviolet curable resin 144 is not mixed with cured resin layer 149 and ultraviolet curable resin 144 can be laminated on cured resin layer 149 in the semi-cured state. As a result, cured resin layer 149 in the semi-cured state can be laminated. On the other hand, when ultraviolet curable resin 144 is completely cured until the physical properties are stabilized, the execution time of one step illustrated in S15 (irradiation time of ultraviolet rays or the like) increases, resulting in a delay in the manufacturing time of molded object 157. On the other hand, in the molding method, the execution time of step S15 can be shortened by semi-curing to an extent that can be laminated. By finally and completely curing laminated cured resin layer 149, it is possible to shorten the manufacturing time of molded object 157 while achieving flattening.

As illustrated in FIG. 7, controller 120 repeatedly executes the steps S11, S13, and S15, laminates cured resin layer 149 in the semi-cured state, and then executes the main curing step of completely curing the laminated cured resin layer 149 (S17). Controller 120 increases the integrated light amount as compared with S15 to execute the curing of cured resin layer 149. For example, controller 120 causes the intensity of the ultraviolet rays of S17 larger than the intensity of the ultraviolet rays of S15. As a result, it is possible to mold molded object 157 that is completely stable at the level of physical properties and cured to such an extent that the droplets of ultraviolet curable resin 144 do not mix. As described above, the transfer amount of S13 is increased, cured resin layer 149 having a small unevenness on the surface can be laminated, and cured resin layer 149 can be laminated with high accuracy. In addition, the unevenness of the surface of final molded object 157 can be reduced to, for example, approximately ten and several μm. The semi-curing step S15 immediately before the main curing step S17 is executed may be omitted. That is, last S15 may be included in S17 and executed.

Figure 12:
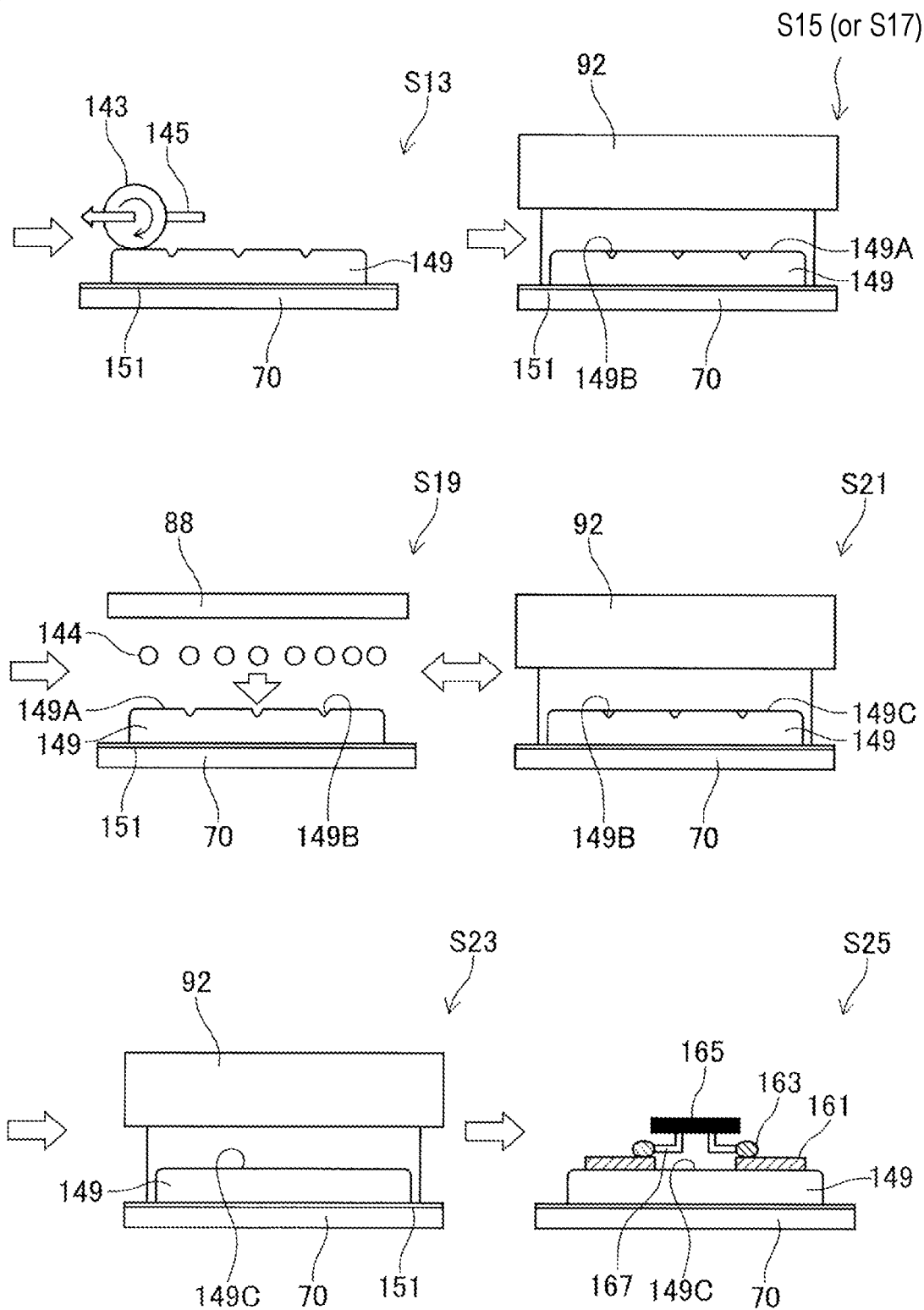
FIG. 12 illustrates a step after the manufacturing step illustrated in FIG. 7.

The structure, manufacturing procedure, and the like of molded object 157 described above are examples. In the following description, as another example of molded object 157, a case where wirings or the like are formed on a surface flattened by roller 143 will be described. FIG. 12 illustrates an example of a manufacturing step after that of FIG. 7. As illustrated in FIG. 12, for example, after executing the flattening step S13, controller 120 executes the semi-curing step S15 or the main curing step S17.

Here, as illustrated in S15 (or S17) in FIG. 12, on upper surface 149A of cured resin layer 149 semi-cured, there is a possibility that uneven portions 149B caused by the curved surface shape of the droplets are formed. The difference in the height of uneven portions 149B may be, for example, the size less than several tens (or 20) μm, and there is a limit to the transfer of the liquid by roller 143 alone. Therefore, even when cured resin layer 149 flattened by adjusting the integrated light amount of ultraviolet rays is laminated, it may be difficult to flatten the surface of final molded object 157 (refer to FIG. 7) to a fine unevenness.

Therefore, as illustrated in S19, controller 120 discharges ultraviolet curable resin 144 from ink jet head 88 on upper surface 149A of cured resin layer 149 semi-cured in S15 or mainly cured in S17. Ultraviolet curable resin 144 discharged on upper surface 149A of cured resin layer 149 forms a thin film layer spread in a thin film shape on upper surface 149A. The thin film layer is formed, for example, by setting a minimum discharge amount at which ultraviolet curable resin 144 can be discharged by ink jet head 88 in the discharging step S19, and scanning upper surface 149A only once. For example, the thin film layer is preferably the thinnest thickness that can be formed in ink jet head 88. Ultraviolet curable resin 144 spread in a thin film shape adheres to upper surface 149A and then enters uneven portion 149B.

Next, as illustrated in S21, controller 120 irradiates toward upper surface 149A from which ultraviolet curable resin 144 is discharged with ultraviolet rays by irradiation device 92, and discharged ultraviolet curable resin 144 is semi-cured. The semi-cured state in S21 is a semi-cured state having higher fluidity than the semi-cured state in S15 described above. For example, the semi-cured state of S19 is a gel-like state where the viscosity is increased from the state of droplets at discharging to fluid. Controller 120 reduces, for example, the intensity, the number of scans, the scanning speed, the scanning time, and the like of the ultraviolet rays irradiated on ultraviolet curable resin 144 as compared with S15, thereby causing ultraviolet curable resin 144 to be in a semi-cured state where the fluidity is enhanced than the state of S15.

Ultraviolet curable resin 144 enters uneven portion 149B while changing the viscosity by irradiating with ultraviolet rays. Controller 120 repeatedly executes the steps S19 and S21. As a result, ultraviolet curable resin 144 spreads so as to close uneven portion 149B to be semi-cured. On upper surface 149A, smooth surface 149C that is flatter than the surface of molded object 157 formed in S11, S13, S15, and S17 is formed. The applicant has confirmed that by forming smooth surface 149C, the height of the unevenness of upper surface 149A of cured resin layer 149 is improved to several μm. By forming such smooth surface 149C, wirings having a more uniform thickness can be formed on cured resin layer 149.

For example, as illustrated in S23, controller 120 causes the integrated light amount larger than that of S21 to mainly cure cured resin layer 149 having smooth surface 149C. Next, as illustrated in S25, wiring 161 is formed on smooth surface 149C cured in S23. Controller 120 forms wiring 161 having a desired wiring pattern, for example, by discharging conductive ink from ink jet head 76 (refer to FIG. 2) of first molding unit 22 to smooth surface 149C, and curing the conductive ink by irradiation device 78.

Accordingly, controller 120 repeatedly executes steps S11, S13, and S15, and executes step S19 of discharging ultraviolet curable resin 144 on laminated cured resin layer 149. Next, controller 120 executes step S21 of irradiating ultraviolet curable resin 144 discharged in S19 with light having the light amount smaller than the light amount of the semi-curing step S15 to cure ultraviolet curable resin 144 without being flattened by roller 143, and forming smooth surface 149C on cured resin layer 149.

As described above, fine uneven portions 149B that cannot be eliminated by roller 143 may be formed on upper surface 149A flattened by roller 143. Therefore, ultraviolet curable resin 144 is discharged on cured resin layer 149, and discharged ultraviolet curable resin 144 is cured without being flattened. In addition, ultraviolet curable resin 144 is semi-cured by irradiating with light having the light amount smaller than the light amount of S15. As a result, ultraviolet curable resin 144 discharged on cured resin layer 149 enters fine uneven portion 149B formed on upper surface 149A of cured resin layer 149 by the leveling effect, spreads and is smoothed (fills uneven portion 149B), and forms, for example, smooth surface 149C having a surface unevenness of ±1 μm or less. It is possible to further suppress the unevenness of the surface of cured resin layer 149. Therefore, the light amount smaller than the light amount of S15 described above is, for example, not the light amount that is semi-cured to the extent that the cured resin layer 149 semi-cured such as S15 can be laminated, and is the light amount such that the droplets of cured resin layer 149 discharged onto cured resin layer 149 can enter (mix) uneven portion 149B of cured resin layer 149 and exert a leveling effect.

Controller 120 executes a step of discharging conductive ink on smooth surface 149C, and a step of curing the discharged conductive ink to form wiring 161 on smooth surface 149C (S25). When the unevenness occurs on cured resin layer 149, in a case where wiring 161 is formed on cured resin layer 149 by a three-dimensional lamination molding method, there is a possibility that the thickness of wiring 161 may be uneven or wiring 161 may be disconnected. In other words, a connection failure occurs. On the other hand, by discharging conductive ink on smooth surface 149C formed on cured resin layer 149 and curing the conductive ink, it is possible to form wiring 161 having a more uniform thickness (having higher electrical characteristics) on the cured resin layer.

Furthermore, as illustrated in S25, controller 120 may form bump 163 on wiring 161 to mount electronic component 165. Specifically, after forming wiring 161, controller 120 controls third molding unit 29 to discharge the conductive paste on wiring 161 by dispenser 130. Controller 120 discharges the conductive paste in accordance with a position connected to component terminal 167 of wiring 161 (position of bump 163).

Next, controller 120 moves stage 52 below mounting unit 26, and mounts electronic component 165 by mounting section 102. Mounting head 112 (refer to FIG. 2) of mounting section 102 picks up and holds electronic component 165 by the suction nozzle, and disposes component terminal 167 of electronic component 165 so as to be located at the positions of the conductive paste. Controller 120 heats and cures the conductive paste by firing section 74 of first molding unit 22 to form bump 163. As a result, component terminal 167 of electronic component 165 is electrically connected to wiring 161 via bump 163. In this manner, mounting board manufacturing apparatus 10 of the present embodiment can execute flattening and smoothing upper surface 149A of cured resin layer 149, and can manufacture a mounting board on which electronic component 165 is mounted on smooth surface 149C.

Incidentally, in the above example, ultraviolet curable resin 144 is an example of a resin material. Step of S11 is an example of a discharging step. Step of S13 is an example of a flattening step. Step of S15 is an example of a curing step. Step of S19 is an example of a second discharging step. Step of S21 is an example of a second curing step. Step of S25 is an example of a third discharging step and a third curing step.

Hereinbefore, according to the present embodiment described above, the following effects are obtained. The molding method of the present embodiment includes the step S11 of discharging ultraviolet curable resin 144 on cured resin layer 149, and the step S13 of transferring a part of ultraviolet curable resin 144 discharged in S11 from cured resin layer 149 to roller 143 to flatten ultraviolet curable resin 144. In addition, the molding method includes the step S15 of irradiating ultraviolet curable resin 144 flattened in S13 with ultraviolet rays having a predetermined integrated light amount to cure ultraviolet curable resin 144, and forming new cured resin layer 149 on cured resin layer 149, and repeatedly executes S11, S13, and S15 to laminate cured resin layer 149. In S15, controller 120 uses an integrated light amount in which first contact angle θ1 of ultraviolet curable resin 144 with respect to cured resin layer 149 is larger than second contact angle θ2 of ultraviolet curable resin 144 with respect to roller 143.

As a result, by making first contact angle θ1 of cured resin layer 149 relatively larger than second contact angle θ2 of roller 143, ultraviolet curable resin 144 is easily repelled from cured resin layer 149, and is easily transferred to roller 143. Accordingly, by adjusting the integrated light amount in S15, the amount of transfer to roller 143 in S13 can be increased, and ultraviolet curable resin 144 can be further flattened by using roller 143. It is possible to suppress the unevenness of upper surface 149A of cured resin layer 149. The fact that "suppressing the unevenness" means, for example, reducing the number of unevenness, reducing the difference in height of the unevenness, or the like.

The present disclosure is not limited to the above-described examples, but can be performed in various forms in which various modifications and improvements are made based on the knowledge of those skilled in the art. For example, in the above example, the ultraviolet curable resin cured by irradiation with ultraviolet rays is adopted as the resin material of the present disclosure, but the present disclosure is not limited thereto. For example, the resin material can adopt various curable resins such as a thermosetting resin cured by heat. In this case, in a case where the thermosetting resin is heated by an infrared heater or the like, flattening can be achieved by adjusting the light amount (infrared light or the like) irradiated from a heat source to be heated in the same manner as ultraviolet rays. In addition, the light amount in the present disclosure is not limited to the integrated light amount per unit area, but may be the light amount irradiated to ultraviolet curable resin 144 per unit time in step S15. In addition, controller 120 may not execute the manufacturing step in FIG. 12. Accordingly, controller 120 may not form wiring 161 or the like on cured resin layer 149 and may not mount electronic component 165. In addition, the three-dimensional lamination molding method in the present disclosure is not limited to an ink jet method or a stereo lithography method (SL), and other methods such as, for example, a fused deposition molding (FDM) method can be employed.

REFERENCE SIGNS LIST

143: roller, 144: ultraviolet curable resin (resin material), 149: cured resin layer, 149C: smooth surface, 161: wiring (conductor), X1: first reference light amount (reference light amount), X2: second reference light amount (reference light amount), θ1: first contact angle, θ2: second contact angle.

The invention claimed is:

1. A molding method comprising:
 a discharging step of discharging a resin material on a cured resin layer, the resin material containing a material having a liquid-repellent property;
 a first curing step of irradiating the resin material discharged in the discharging step with light having a first light amount to semi-cure the resin material, a first contact angle of the resin material, with respect to the cured resin layer, increases based on the first light amount until saturated to a predetermined angle;
 a flattening step of transferring a part of the resin material discharged by the discharging step and semi-cured in the first curing step from the cured resin layer to a roller to flatten the resin material; and
 a second curing step of irradiating the resin material flattened by the flattening step with light having a second light amount to cure the resin material, and forming a new cured resin layer on the cured resin layer, wherein
 the discharging step, the first curing step, the flattening step, and the second curing step are repeatedly executed, and the resin material is laminated, and
 the first contact angle is larger than a second contact angle of the resin material with respect to the roller.

2. The molding method according to claim 1, further comprising:
 a second discharging step of discharging the resin material on the new cured resin layer laminated by repeatedly executing the discharging step, the first curing step, the flattening step, and the second curing step; and
 the second light amount is smaller than the first light amount in the first curing step.

3. The molding method according to claim 2, further comprising:
 a third discharging step of discharging a fluid containing metal particles on the new cured resin layer; and
 a third curing step of curing the fluid containing the metal particles discharged by the third discharging step, and forming a metallic conductor.

4. The molding method according to claim 1, wherein
 at least one of an intensity of light for irradiation in the first curing step, a scanning speed of light for scanning the resin material in the first curing step, or a number of scans of light for scanning the resin material in the first curing step is changed to set the first light amount.

5. The molding method according to claim 1, wherein the first light amount is an integration of a time during which ultraviolet light is irradiated per unit area and an intensity of the ultraviolet light.

* * * * *